US009116522B2

(12) United States Patent
Spitzer

(10) Patent No.: US 9,116,522 B2
(45) Date of Patent: Aug. 25, 2015

(54) ALTERNATING STATE FLOW VALVE

(75) Inventor: Jeffrey Justin Spitzer, San Diego, CA (US)

(73) Assignee: AEROMASTER INNOVATIONS, INC., San Diego, CA (US)

( * ) Notice: Subject to any disclaimer, the term of this patent is extended or adjusted under 35 U.S.C. 154(b) by 885 days.

(21) Appl. No.: 12/435,271

(22) Filed: May 4, 2009

(65) Prior Publication Data

US 2010/0186838 A1   Jul. 29, 2010

Related U.S. Application Data

(60) Provisional application No. 61/206,186, filed on Jan. 28, 2009.

(51) Int. Cl.
*F16K 31/12* (2006.01)
*G05D 7/01* (2006.01)

(52) U.S. Cl.
CPC ....... *G05D 7/0113* (2013.01); *Y10T 137/86413* (2015.04)

(58) Field of Classification Search
CPC ............... G05D 7/0113; Y10T 137/86413
USPC .......... 137/509, 627, 624.13, 624.14, 624.11, 137/119.08, 119.032, 494, 497, 504, 137/505.13, 505.14, 505.46, 505.47, 460, 137/508, 514; 251/230, 54, 77; 138/40
See application file for complete search history.

(56) References Cited

U.S. PATENT DOCUMENTS

| | | | |
|---|---|---|---|
| 1,930,521 A * | 10/1933 | Kellogg | 137/505.13 |
| 2,702,048 A * | 2/1955 | Coffey | 137/505.13 |
| 2,793,908 A | 5/1957 | Carver, Jr. | |
| 3,018,788 A | 1/1962 | Perlis | |
| 3,080,881 A * | 3/1963 | Stilwell et al. | 137/119.03 |
| 3,147,770 A | 9/1964 | Perlis | |
| 3,220,695 A | 11/1965 | Downey et al. | |
| 3,241,569 A | 3/1966 | Sully | |
| 3,519,016 A | 7/1970 | Kah, Jr. et al. | |
| 3,853,145 A * | 12/1974 | Judd | 137/624.18 |
| 3,872,884 A * | 3/1975 | Busdiecker et al. | 137/498 |
| 4,029,119 A | 6/1977 | Klieves | |
| 4,051,767 A | 10/1977 | Landsberg | |
| 4,092,995 A | 6/1978 | Stubenruss | |
| 4,109,670 A | 8/1978 | Slagel | |
| 4,116,216 A * | 9/1978 | Rosenberg | 137/624.13 |

(Continued)

FOREIGN PATENT DOCUMENTS

WO   WO2007013066   *   2/2007 ............ F16K 17/20

*Primary Examiner* — Len Tran
*Assistant Examiner* — Joel Zhou
(74) *Attorney, Agent, or Firm* — Lowe Graham Jones PLLC

(57) ABSTRACT

An improved sequencing fluid control valve comprising a housing having an inlet port and an outlet port, a valve seat disposed within the housing, a collapsible valve member disposed within the housing and forming a chamber and a bulb. A sequencing means disposed within the chamber that controls the axial motion of the valve member in response to application of fluid pressure at the inlet such that the motion of valve member alternates between an open free flowing state and a closed restricted flow state. Housing and valve member cooperate in the open position to provide an annular flow path that does not require the fluid flow direction to change by more than 45 degrees while flowing from inlet to outlet. Housing and valve member bulb cooperate in the closed position to form a circumferential seal to restrict the fluid flow.

5 Claims, 15 Drawing Sheets

(56) References Cited

U.S. PATENT DOCUMENTS

| | | | | |
|---|---|---|---|---|
| 4,201,340 | A | 5/1980 | Georgiev et al. | |
| 4,221,236 | A | 9/1980 | Rosenburg | |
| 4,262,879 | A | 4/1981 | Gonner | |
| 4,407,451 | A | 10/1983 | Hunter | |
| 4,546,787 | A | 10/1985 | Meyers et al. | |
| 4,561,343 | A | 12/1985 | Mummert | |
| 4,632,361 | A | 12/1986 | Callison | |
| 4,643,217 | A * | 2/1987 | Frentzel | 137/112 |
| 4,662,397 | A | 5/1987 | Callison | |
| 4,729,406 | A | 3/1988 | Frentzel | |
| 4,790,512 | A | 12/1988 | Lindsay | |
| 4,821,996 | A | 4/1989 | Bellotti et al. | |
| 4,823,837 | A | 4/1989 | Frentzel | |
| 4,872,638 | A | 10/1989 | Thompson et al. | |
| 4,960,218 | A | 10/1990 | Toida et al. | |
| 5,003,771 | A | 4/1991 | Kester et al. | |
| 5,022,426 | A | 6/1991 | Fischer | |
| 5,086,852 | A | 2/1992 | van Buskirk | |
| 5,100,056 | A | 3/1992 | Theodorsen et al. | |
| 5,251,343 | A | 10/1993 | Goettl | |
| 5,609,178 | A | 3/1997 | Hennig et al. | |
| 5,687,815 | A | 11/1997 | Antila et al. | |
| 5,708,219 | A | 1/1998 | Scheppers et al. | |
| 5,878,953 | A | 3/1999 | Coffman | |
| 5,915,410 | A * | 6/1999 | Zajac | 137/341 |
| 5,944,052 | A | 8/1999 | Rashidi | |
| 6,029,691 | A * | 2/2000 | Tavor | 137/219 |
| 6,176,258 | B1 | 1/2001 | Bernardi | |
| 6,186,413 | B1 | 2/2001 | Lawson | |
| 6,286,765 | B1 | 9/2001 | Byles | |
| 6,495,034 | B1 | 12/2002 | Schmidtke et al. | |
| 6,622,933 | B1 * | 9/2003 | Young et al. | 239/66 |
| 6,702,138 | B1 * | 3/2004 | Bielecki et al. | 220/254.9 |
| 6,755,204 | B2 | 6/2004 | Herbert et al. | |
| 6,899,285 | B2 | 5/2005 | Goettl et al. | |
| 6,932,277 | B1 | 8/2005 | Ericksen et al. | |
| 6,957,782 | B2 | 10/2005 | Clark et al. | |
| 7,040,840 | B2 | 5/2006 | Zook | |
| 7,073,678 | B1 | 7/2006 | Dibdin et al. | |
| 7,084,741 | B2 | 8/2006 | Plummer | |
| 7,111,638 | B2 * | 9/2006 | Johnson | 137/460 |
| 7,156,322 | B1 | 1/2007 | Heitzman | |

* cited by examiner

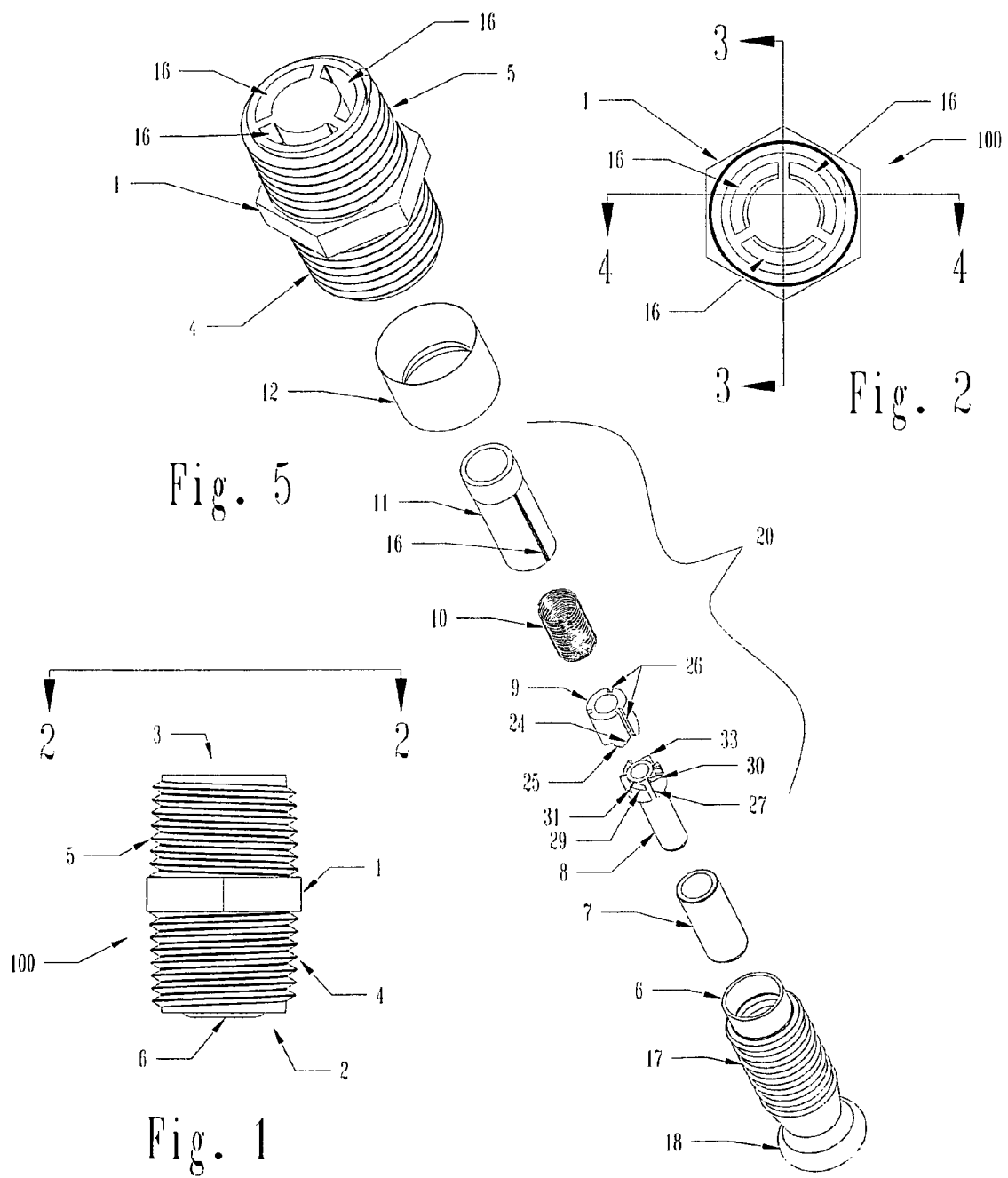

ALTERNATING STATE FLOW VALVE

RELATED APPLICATIONS

This non-provisional patent application claims priority to U.S. Provisional Application Ser. No. 61/206,186, Entitled "Alternating State Flow Valve and Method", by Jeff Spitzer, filed on Jan. 28, 2009, incorporated by reference under the benefit of U.S.C. 119(e).

FIELD OF THE INVENTION

This invention relates to a valve that can be used to add new capability to fluid flow systems. The valve responds to periodic applications of pressure by alternating from a free flowing configuration to a restricted flow configuration.

BACKGROUND OF THE INVENTION

In many dry climates, distributed subterranean plumbing systems are used to supplement natural watering for landscape irrigation. These systems typically consist of one or more zonal fluid circuits each comprising a single control valve, a main supply conduit and a plurality of spray heads connected to the main supply conduit using a threaded adapter commonly called a nipple. In the majority of US residential and commercial ornamental applications, the nipple size is ½ NPT (National Pipe Thread) and has an internal dimension of approximately 0.55 inches and a minimum length of approximately 1.3 inches when the input and output threads are nearly touching at the midpoint. This shortest length is referred to as a "close nipple". Longer nipples are also available. The proper length nipple positions the spray head at the desired height for the particular spray head and main supply conduit depth. Adapters are available that allow a close nipple to be extended to any common length, thus making the close nipple a universally adaptable size. When the control valve is open, water flows from the source into the fluid circuit thus pressurizing the main supply conduit. The pressurized water then flows through the plurality of nipple adapters and emanates from the spray heads with velocity sufficient to propel the water through the air. By arranging the location of the spray heads and the direction of spray, large areas can be irrigated with relatively few spray heads.

The spray distance is determined by the elevation angle and velocity of the spray. The elevation angle is typically fixed by the spray head geometry. The velocity is directly related to the pressure in the circuit. The pressure is determined by an equilibrium condition between the supply capacity and the total usage of the spray heads. A problem arises when the equilibrium pressure is insufficient to provide adequate velocity. Inadequate velocity results in insufficient spray distance and thus inadequate water distribution. The inadequate pressure is caused by a mismatch in the system. Too many heads or heads that require high flow volume can over-burden the supply. Alternately, too much restriction or flow distance between the supply and flow heads can compromise the capability of the supply.

Once a distribution problem is recognized, the solution alternatives are very limited. The typical response is to add more heads to the circuit in an attempt to "fill-in" the areas where the existing heads do not adequately irrigate. This often fails to produce the desired results. The additional heads use more flow and thus reduce the equilibrium pressure. This results in additional loss of spray distance and thus introduces new distribution problems. Another alternative is to reduce the number of heads. This allows for higher equilibrium pressure and thus greater spray distance but distribution options are reduced. Two more difficult alternatives are to add a new circuit or improve the plumbing of the existing circuit. Both of these alternatives require digging up the landscape areas that are receiving insufficient irrigation. This fact, combined with high cost and excessive labor requirements, makes these alternatives unattractive.

Prior art has taught that a sequencing valve can be used to allow a fluid flow conduit to be subdivided such that the fluid selectively flows to the subdivided conduits without the need for additional activated control valves. The advantage of these sequencing valves is that a larger number of spray heads can be attached to the subdivided system without causing excessive flow demand.

The first known prior art was Carver, U.S. Pat. No. 2,793,908. Carver taught the method of using a sequencing valve associated with each spray head said valve being sequenced between open and closed states by application and removal of pressure from the valve inlet port. Carver's valve contained design features which would have made it unreliable in service. The valve depended upon sliding seals that would be subject to wear. Such wear would lead to external leakage. The sliding seals were also in contact with the fluid passing through the valve. It is likely that impurities in the fluid would have caused frictional changes in the seals that would impede proper operation. The Carver valve was also very large compared to the normal flow conduit.

Perlis, U.S. Pat. No. 3,018,788 taught of an improved design that eliminated most of these problems. Perlis' valve was more compact and closely matched the existing conduit size. Perlis' valve also did not rely on sliding seals and avoided any possibility of external leakage due to wear. Perlis' valve had a critical flaw, however, wherein the pressure responsive piston relied upon a close fit within the valve body to prevent the fluid from passing the piston without actuating the valve. This valve would have been very sensitive to impurities such as dirt or grit which would become lodged between the piston and the housing thus rendering the valve non-functional. Perlis' improved valve, U.S. Pat. No. 3,147,770 re-arranged the sequencing and valve means to avoid the aforementioned contamination problem at the expense of increased size and addition of a sliding internal seal.

Henning, et al U.S. Pat. No. 5,609,178 taught of an alternative means to actuate the valve wherein a flow obstruction within the valve caused a differential pressure between the inlet and outlet ports that actuated the sequencing means. This method is undesirable because the design requires a predetermined flow rate to operate properly and necessarily causes a pressure loss as the fluid passes through.

Perhaps the most advanced prior art belongs to Sully et al, U.S. Pat. No. 3,241,569. In this example, the major problems related to sliding seals and contamination are fully eliminated. However, this design still has major shortcomings. It is large and complex and therefore cannot be retrofit into residential systems economically. It also requires the fluid to make two 90 degree turns through a passage that is relatively small compared to the inlet and outlet ports. While this arrangement is widely accepted in the art of flow control valves, it is also well known to cause a relatively large pressure loss when the fluid flow rate through the valve is high compared to the port size.

Other prior art failed to fully address all of the shortcomings described here. Examples include:
  Kah, Jr. Et al, U.S. Pat. No. 3,519,016
  Judd, U.S. Pat. No. 3,853,145
  Rosenberg, U.S. Pat. No. 4,116,216 and U.S. Pat. No. 4,221,236

Callison, U.S. Pat. No. 4,632,361 and U.S. Pat. No. 4,662,397

Fischer, U.S. Pat. No. 5,022,426

Young, Et al, U.S. Pat. No. 6,622,933

All of the above referenced patents suffer from one or more of the following shortcomings. 1) The pressure responsive and/or sequencing means is exposed to the fluid flow and is therefore sensitive to impurities in the fluid. 2) The size and/or complexity does not allow for economical retrofit within existing residential systems. 3) The fluid flow path contains abrupt changes of cross sectional area and/or direction that lead to large pressure losses for high fluid flow rates.

It is therefore an object of the present invention to provide a sequencing valve that eliminates all of these shortcomings. Specifically, it is an object of the present invention to provide valve capable of operating with impurities in the fluid flow ranging in size from microscopic to objects as large as the conduit itself. It is further an object of the present invention to provide a valve that has the same dimensions as an existing ½" NPT close nipple, making it universally adaptable to all typical residential and commercial ornamental applications. It is also an object of the present invention to provide a valve that can be manufactured for low cost such that an economic advantage can be realized when a plurality of valves are used instead of a major redesign of the main supply conduits. Finally, it is an object of the present invention to provide a valve that provides a highly efficient fluid flow path in the open state thus minimizing the fluid pressure drop for high flow rates.

BRIEF DESCRIPTION OF THE DRAWINGS

FIG. 1: Is an elevation view of the preferred embodiment.

FIG. 2: Is a plan view of the preferred embodiment as defined in FIG. 1.

FIG. 5: Is an exploded view of the preferred embodiment shown in FIGS. 1 through 4.

DETAILED DESCRIPTION OF THE INVENTION

Figure 7:
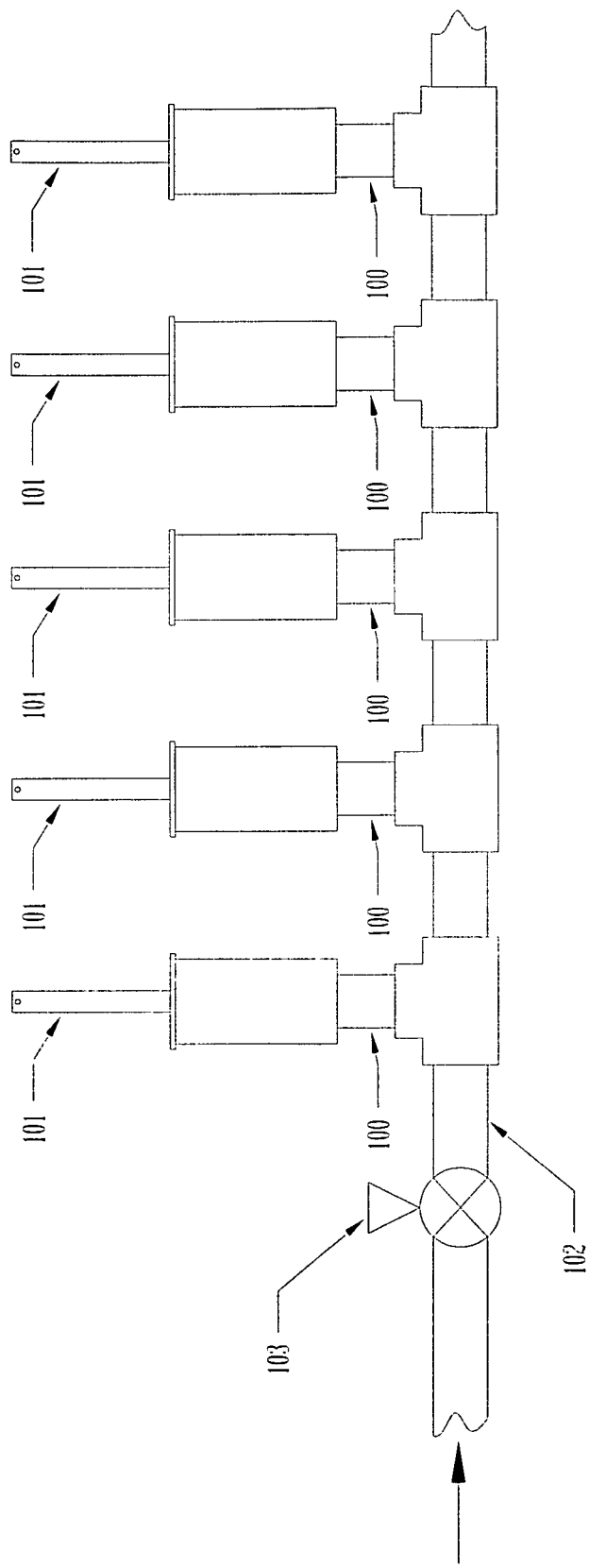
FIG. 7 is a schematic view showing the fluid flow apparatus installed in a typical irrigation system.

The present invention provides a low cost and convenient solution to the problem of improving irrigation sprinkler coverage. Referring to FIG. 7, the threaded pipe nipple that commonly attaches each spray head 101 to a main supply conduit 102 is replaced with an alternating fluid flow valve 100 (alternating fluid flow apparatus). Each time the main supply conduit 102 is pressurized, each valve 100 assumes either an open free flowing state or a closed non-flowing state. If half of the valves 100 are open and half of the valves 100 are closed, then the total usage of the spray heads is one half. This provides a higher pressure and thus better spray distance. Each time the pressure is removed and restored, the valves 100 change state. Thus, the valves 100 that were previously closed become open and vice versa. By simply pressurizing the main supply conduit 102 twice rather than once, all spray heads are activated with high pressure and adequate distribution is attained.

This solution is particularly convenient because installation is simple. Each spray head 101 is unscrewed from the main supply conduit 102 and the alternating valve 100 is installed in place of the existing nipple adapter. Before installing each valve 100, the installer configures the valve 100 in either the ready-to-open state or the ready-to-close state.

In most cases, an electronic controller actuates circuit supply valve 103. The electronic controller is simply reprogrammed to actuate the electronically controlled supply valve 103 twice as often. The energy required to actuate the alternating valves 100 is supplied by the main supply conduit 102 fluid pressure, thus no additional power source, plumbing or wiring is required. What follows is a description of the valve 100 and its operation followed by a very detailed description of an exemplary embodiment of the valve 100.

FIGS. 1-5 depict the fluid flow apparatus or valve 100 of the present invention. FIG. 1 depicts a side view of the valve 100 which has a fluid inlet end 2 and a fluid outlet end 3. The valve 100 includes a housing 1 which is further depicted with respect to FIG. 3A. The housing 1 includes a mounting cavity 14 which is utilized to mount a compressible valve 6 and a valve seat cavity 15 configured to receive a valve seat 12. In an alternative embodiment, the valve seat 12 is integrally molded as part of the housing 1.

Figure 3A:
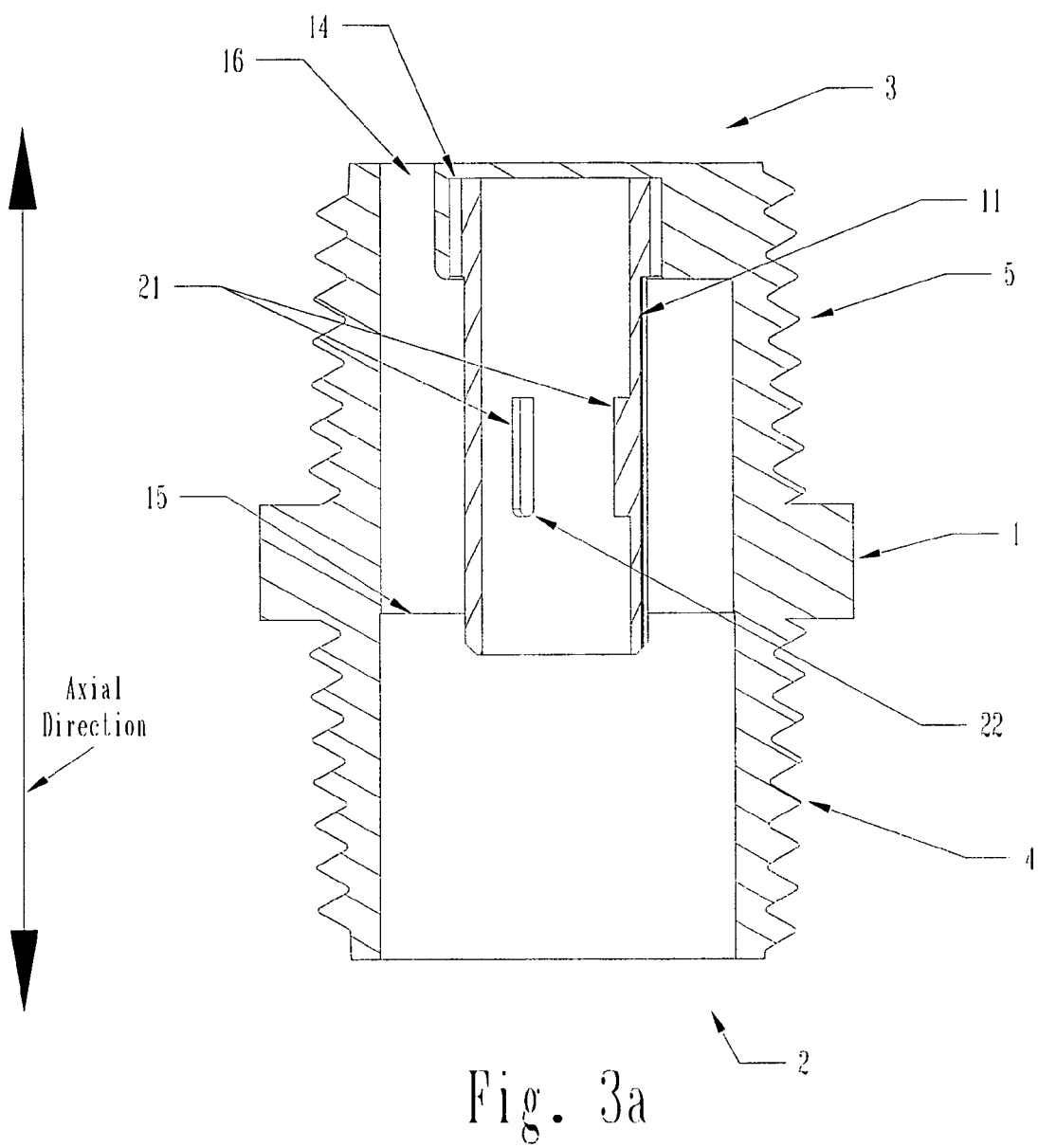
FIG. 3a: Is a section view as defined in FIG. 2 through the preferred embodiment with most parts removed to show the internal configuration of the main housing and switch housing.
Figure 3B:
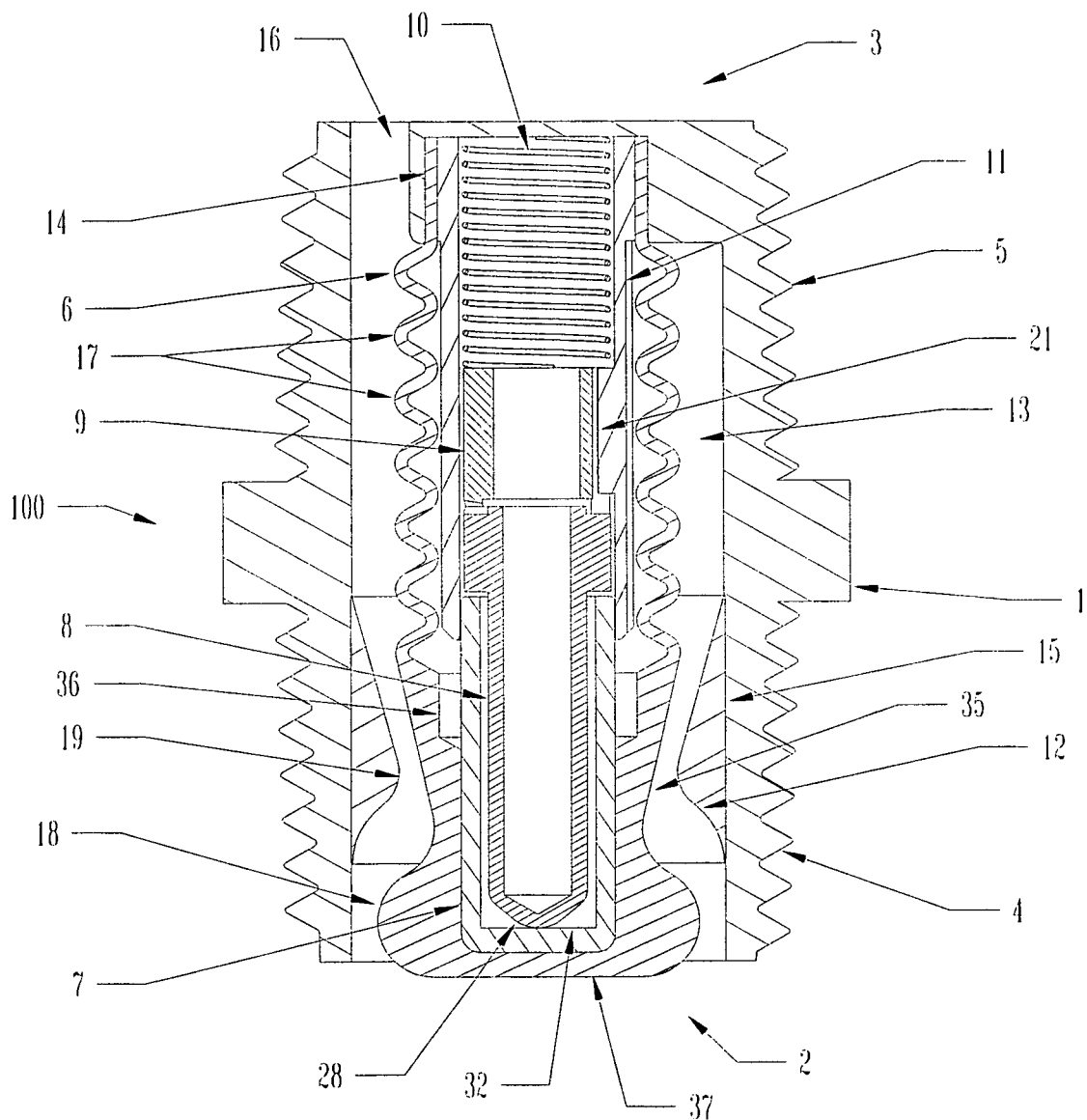
FIG. 3b: Is a section view as defined in FIG. 2 through the preferred embodiment showing the internal configuration in the first free state.

Referring to FIGS. 5 and 3b, the valve includes valve seat 12, a sequencing mechanism 20, and a compressible valve 6 all assembled into housing 1. Compressible valve 6 has an outer valve surface 35 that is configured to form a circumferential seal against valve seat 12 when the valve is in a closed state. In a preferred embodiment outer valve surface 35 includes a distal sealing surface or bulb 18 for sealing against valve seat 12. The outer valve surface 35 also includes undulations 17 that allow compressible valve 6 to compress and expand in an axial direction responsive to the fluid pressure supplied to the inlet. The axial direction is defined by the common axis that connects fluid inlet 2 and fluid outlet 3.

Sequencing mechanism 20 is positioned between a distal end 37 of compressible valve 6 and fluid outlet end 3. In a preferred embodiment, sequencing mechanism 20 is contained within a cavity or chamber defined by an inside surface 36 of compressible valve 6. This allows for a very compact design of apparatus 100 and protects sequencing mechanism 20 from getting jammed due to the introduction of particulates from fluid passing through apparatus 100. In one embodiment, the chamber is sealed by housing 1 proximate to the outlet end 3. In this embodiment a proximal end of compressible valve 6 seals to housing 1 proximate to outlet end 3.

Because compressible valve 6 protects and seals sequencing mechanism 20 from particles, compressible valve 6 provides a dual function of protecting sequencing mechanism 20 and providing bulb 18 for engaging valve seat 12 when apparatus 100 is in the closed state. Compressible valve 6 is configured to compress axially to allow bulb 18 to provide an open and closed state for valve 100. In the open state a spacing or annular fluid gap is provided between bulb 18 and valve seat 12. In the closed state bulb 18 provides a circumferential seal to valve seat 12.

Figure 6:
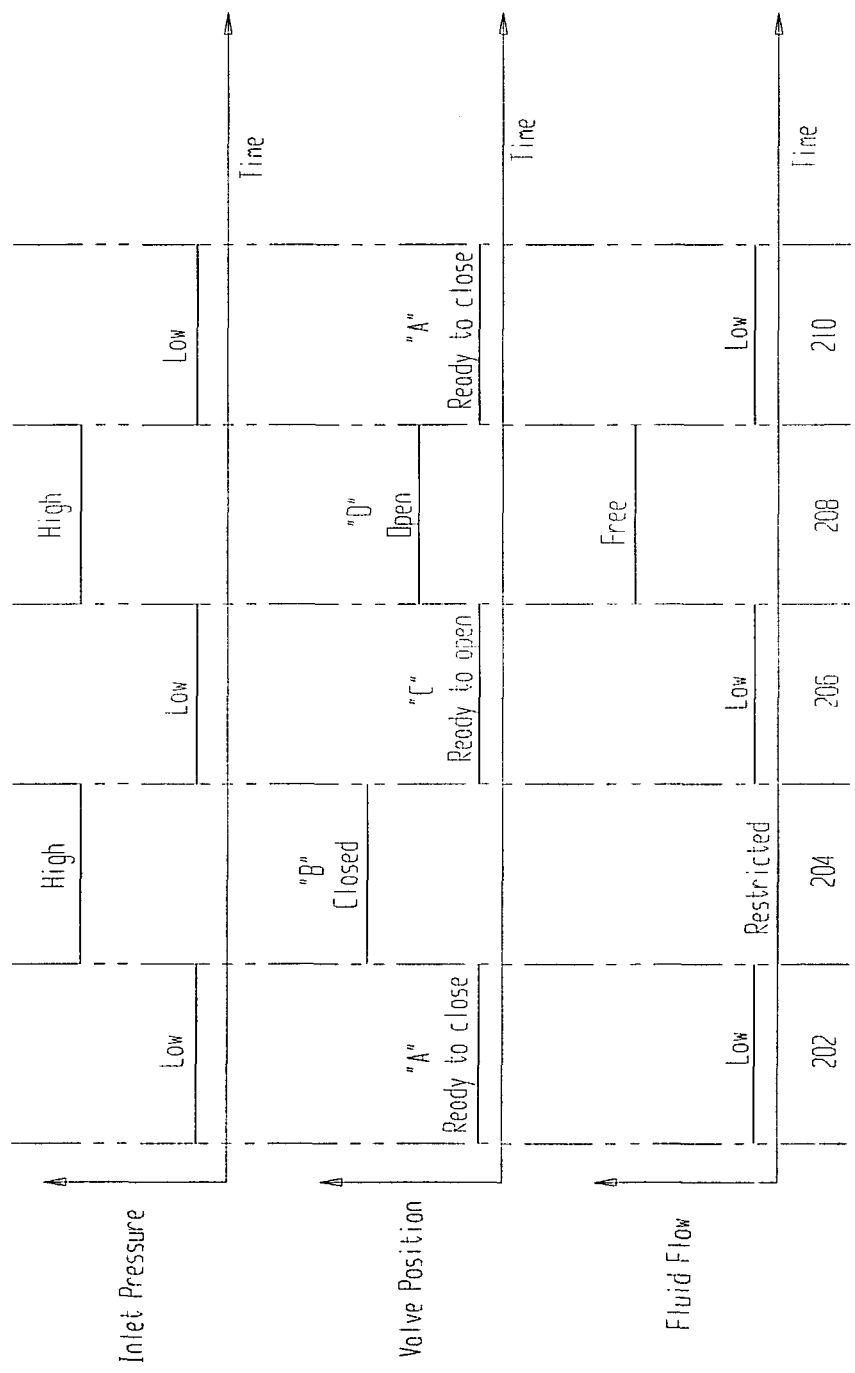
FIG. 6 is a state timing diagram for the use of fluid flow apparatus.

FIG. 6 in combination with FIGS. 3-4 depict operation of valve 100. FIG. 6 is a steady state timing diagram depicting fluid pressure applied to inlet 2 (top graph), the state of valve 100 (middle graph), and fluid flow between inlet and outlet (bottom graph) versus time (horizontal axis). This figure depicts how sequencing mechanism 20 operates. Sequencing mechanism 20 comprises four states. The states are defined as A) un-pressurized (free state) and ready to close; B) closed; C) un-pressurized (free state) and ready to open and D) open.

Figure 4A:
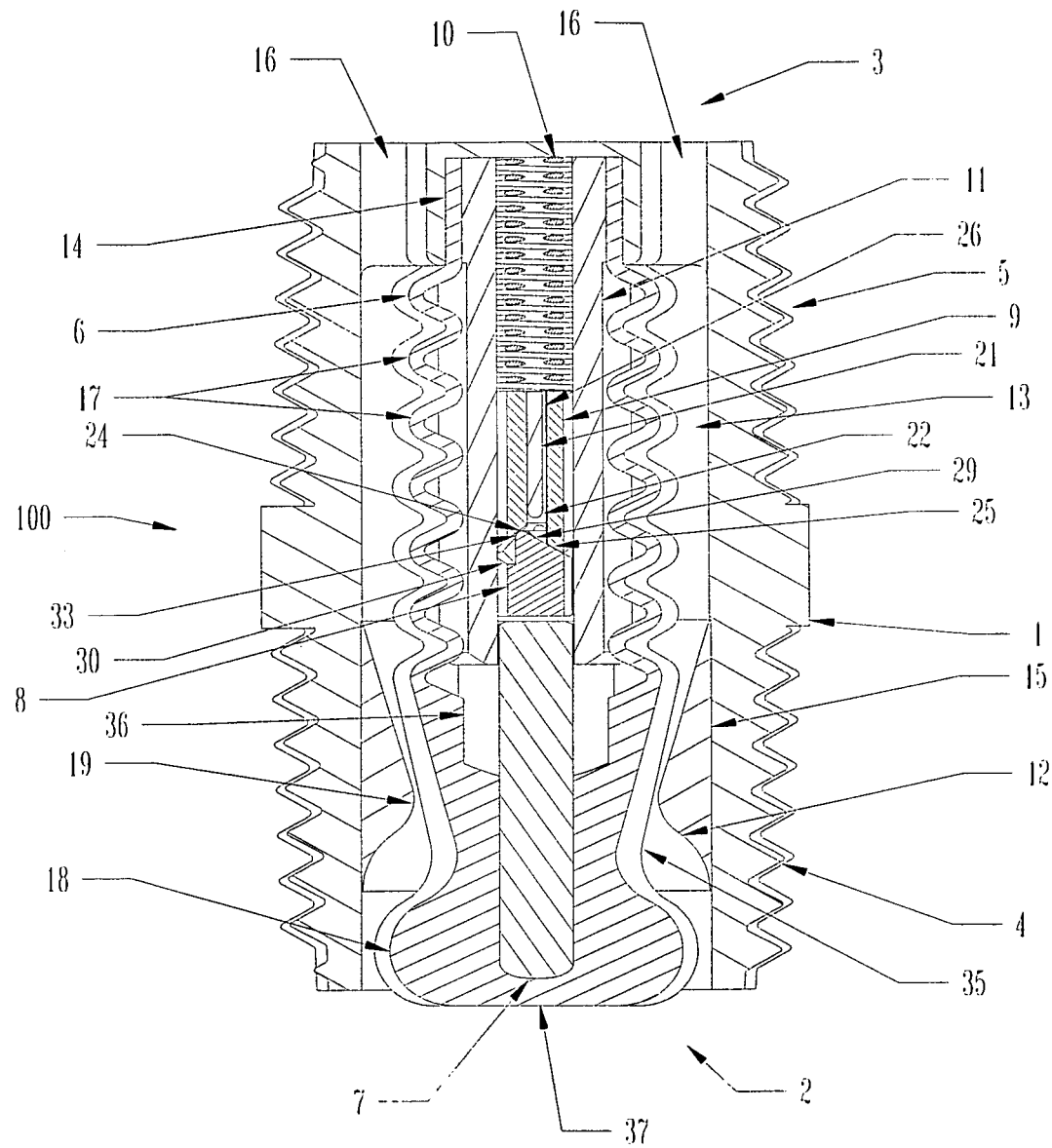
FIG. 4a: Is a section as defined in FIG. 2 through the preferred embodiment showing the sequencing mechanism details in the first free state.

According to time period 202 the fluid pressure applied to the inlet 2 (top graph) is low. The valve is in the ready to close state (middle graph). Fluid flow through the valve is low (bottom graph). FIG. 3b and FIG. 4a depict the valve in this state.

Figure 3C:
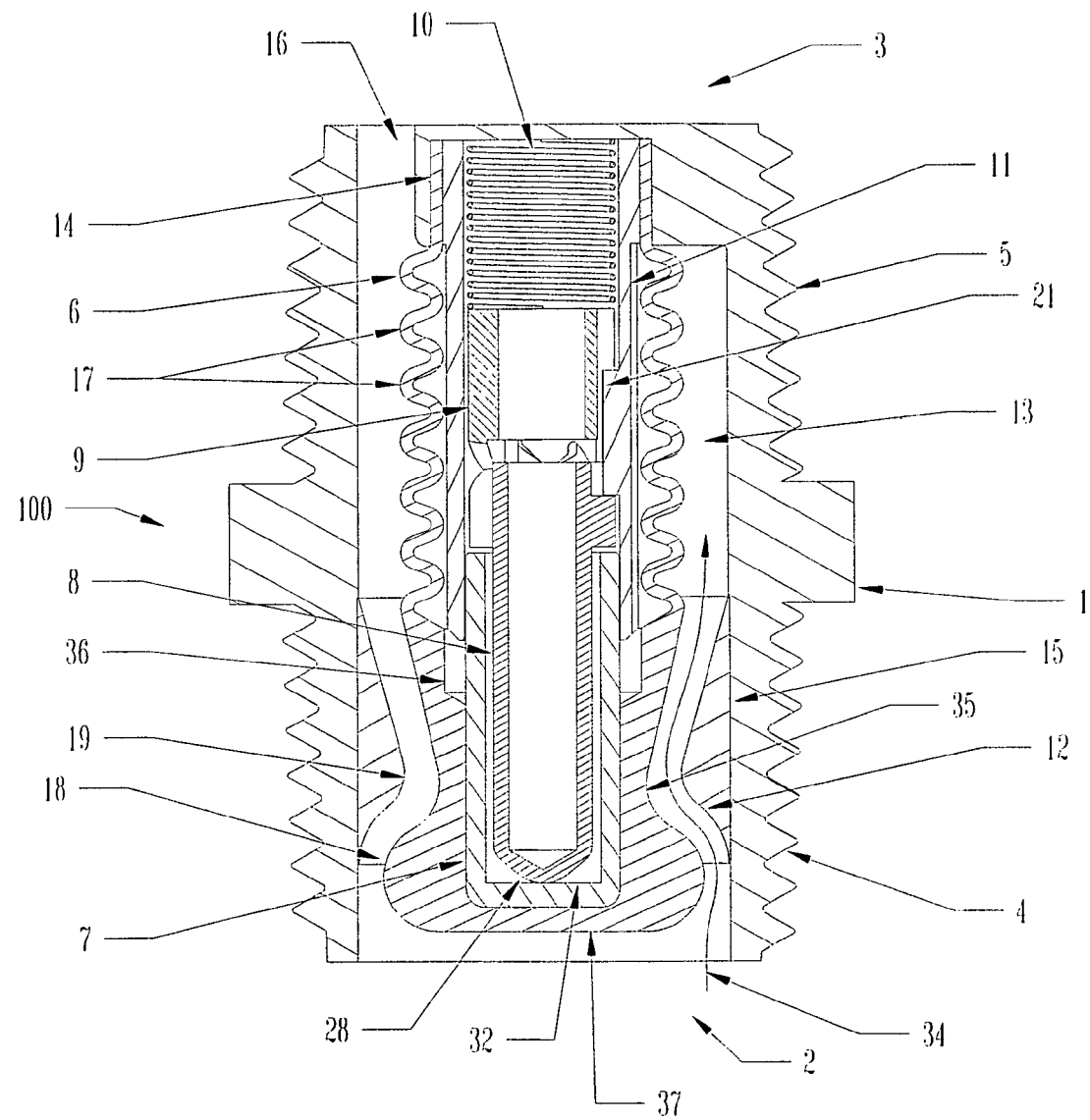
FIG. 3c: Is a section view as defined in FIG. 2 through the preferred embodiment showing the internal configuration in the fourth open state.
Figure 3D:
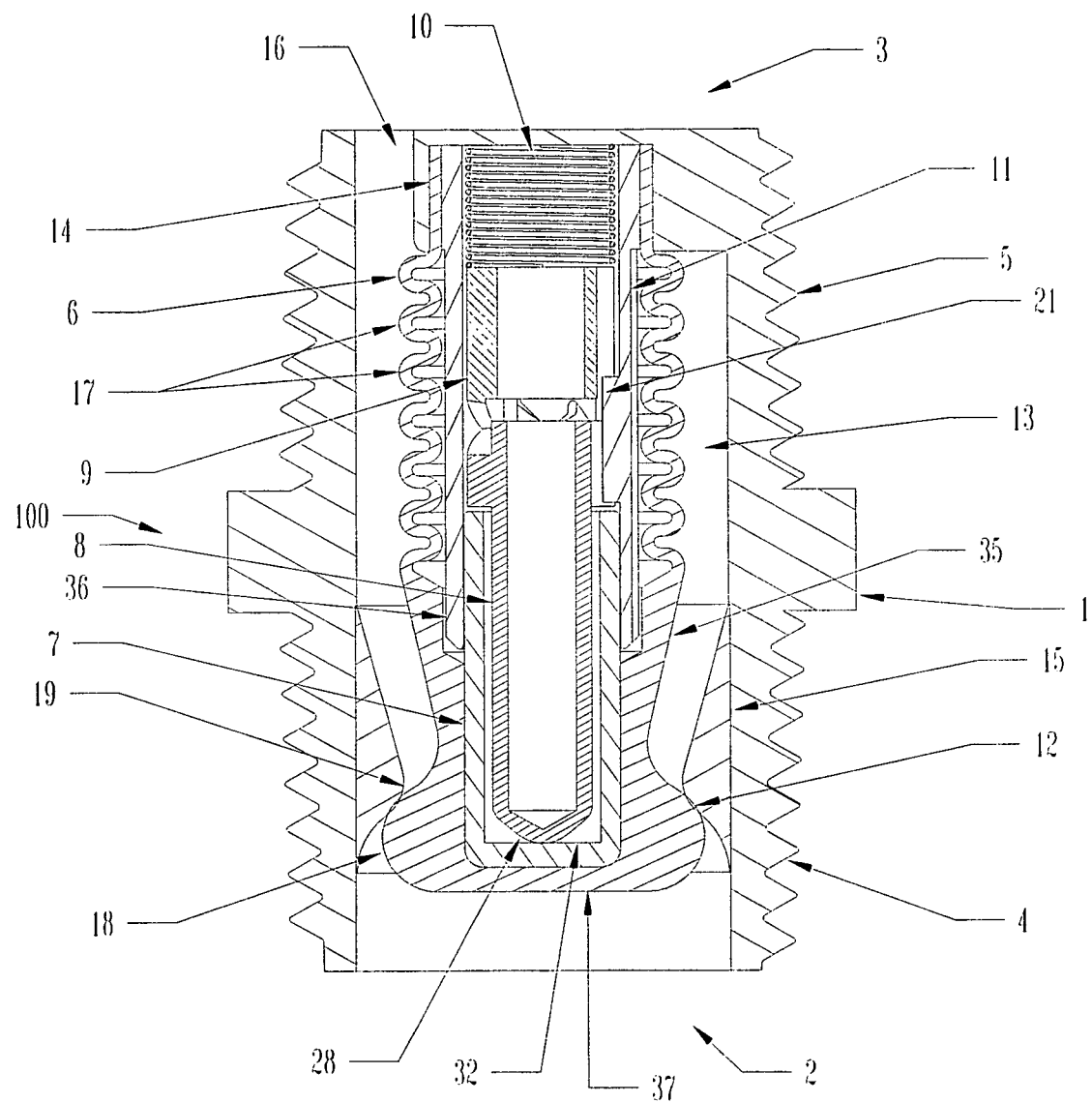
FIG. 3d: Is a section view as defined in FIG. 2 through the preferred embodiment showing the internal configuration in the second closed state.
Figure 4B:
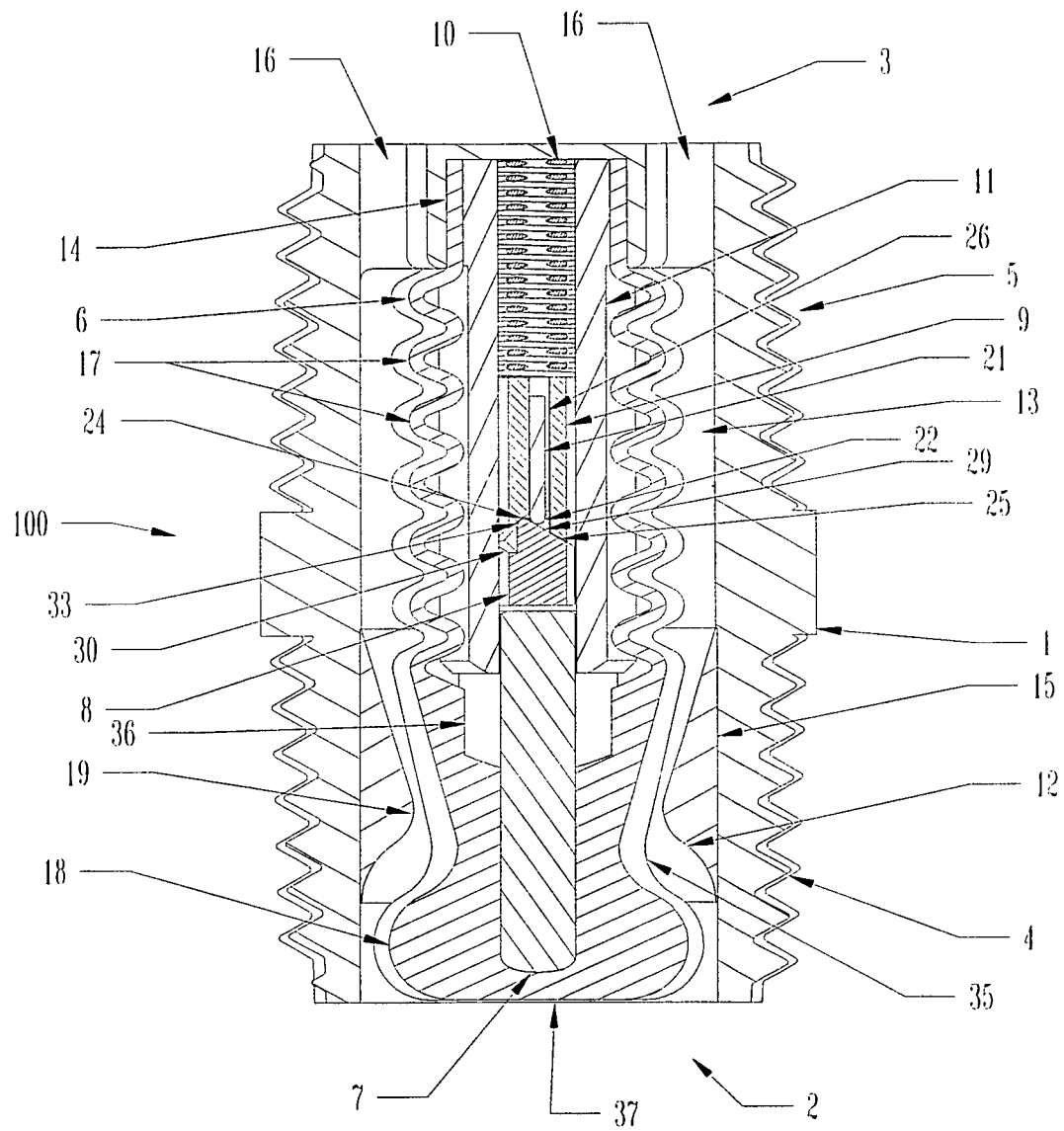
FIG. 4b: Is a section as defined in FIG. 2 through the preferred embodiment showing the sequencing mechanism details while moving from the first free state to the second closed state.

According to time period 204, the fluid pressure applied to the inlet 2 is high. The valve is in the closed state, and fluid flow through valve 100 is restricted. FIGS. 3d and 4b depict the valve 100 in this closed state. Since sequencing mechanism is in the second or closed state, bulb 18 now is allowed to move and to circumferentially seal against valve seat 12 according to FIG. 3d. This restricts or blocks fluid passage between fluid inlet 2 and outlet 3.

Figure 4C:
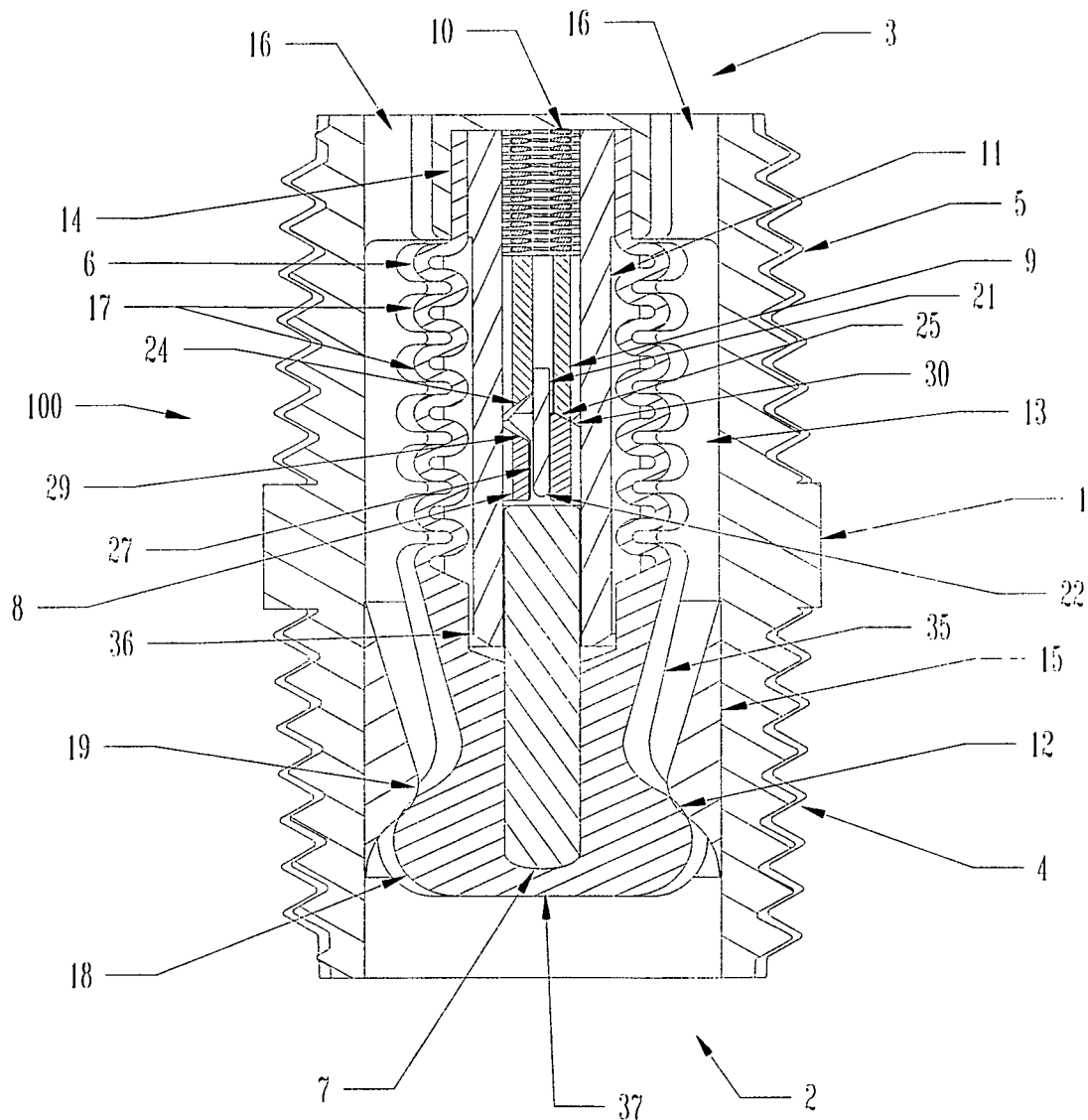
FIG. 4c: Is a section as defined in FIG. 2 through the preferred embodiment showing the sequencing mechanism details in the second closed state.
Figure 4D:
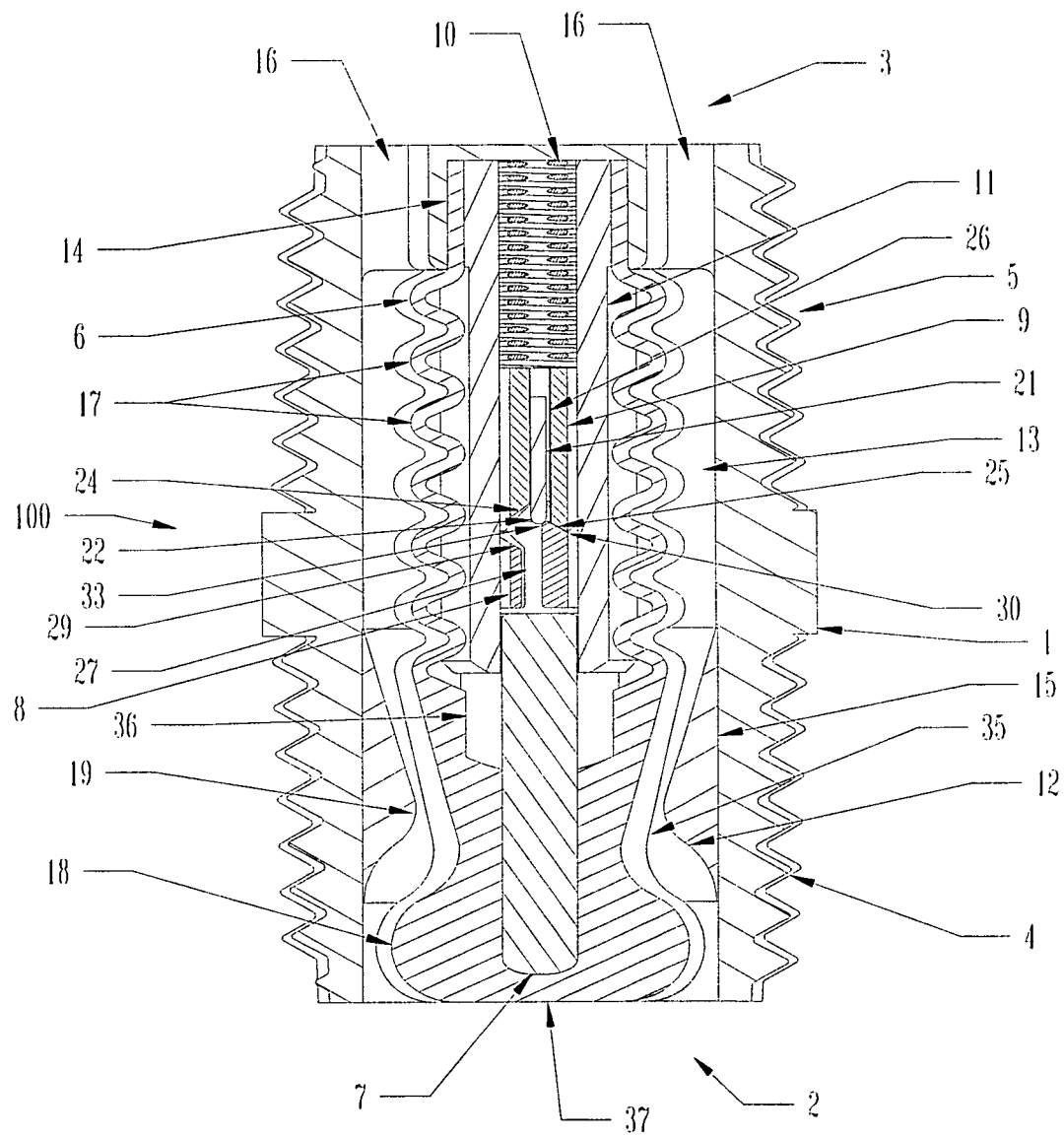
FIG. 4d: Is a section as defined in FIG. 2 through the preferred embodiment showing the sequencing mechanism details while moving from the second closed state to the third free state.

According to time period 206, high fluid pressure is no longer applied to inlet 2. This allows the valve and sequencing mechanism to move to the third, ready to open state. FIG. 4c depicts the valve 100 in this third state. Fluid flow through the valve is low.

According to a time period 208, the fluid pressure applied to the inlet 2 is once again high. The valve is in the open state, and fluid flow through valve 100 is free. Sequencing mechanism 20 is maintaining an open condition of valve 100 whereby a spacing or annular fluid gap is maintained between bulb 18 and valve seat 12. Further, the flow area along annular flow path 34 is substantially constant and the fluid is allowed to move in a substantially axial path to minimize pressure loss.

According to time period 210, high fluid pressure is no longer applied to inlet 2. Because sequencing mechanism is in the first or ready to close state, a fluid gap is maintained between bulb 18 and valve seat 12 so that fluid may flow through valve 100. Thus, valve 100 has the same state during time periods 202 and 210.

According to FIG. 6 sequencing mechanism 20 changes state in response to repeated pressure cycles. Sequencing mechanism 20 is configured to sequence fluid flow apparatus 100 between open and closed states in response to repeated pressure cycles or cycled pressure applied to inlet 2. During a closed or second state sequencing mechanism 20 is configured to allow outer surface or bulb 18 to seal against valve seat 12. During an open or fourth state sequencing mechanism 20 is configured to maintain a fluid gap or spacing between bulb 18 of compressible valve 6 and valve seat 12.

The timing diagram above is a state diagram in that it does not show transient factors. For example, in a transition from no flow to flowing states the fluid flow will tend to vary rapidly over time but this is not shown for illustrative simplicity. Now we turn to a more detailed description of the structure and operation of fluid flow apparatus 100 that includes additional details of the sequencing apparatus 20.

Referring to FIGS. 1 and 5, the preferred embodiment includes a substantially tubular main housing (1) comprising an input end (2) and an output end (3). Input end (2) includes input thread (4) for installation into the supply plumbing. Output end (3) includes output thread (5) for installation of the output plumbing. Referring to FIG. 3a, additional features of the main housing can be examined. Main housing (1) further comprises a main passage (13), a mounting cavity (14), a valve seat cavity (15), and at least one output passage (16). The purpose of each of these will be clarified in the following descriptions.

Referring now to FIG. 3b, a compressible valve (6) is fixedly installed and sealed in mounting cavity (14) thus forming a closed vessel within compressible valve (6). Because the compressible valve (6) is a closed vessel, application of an increasing uniform external pressure will tend to collapse the compressible valve (6), thus reducing the internal volume and increasing the internal pressure within valve (6). The compressible valve (6) is made from a semi-rigid material and further comprises undulations (17) and valve bulb (18). Because the compressible valve (6) is supported against collapse except for the undulations (17), application of an increasing uniform external pressure will collapse only the undulations (7) thus causing the valve bulb (18) to move axially away from the input end (2) and towards the output end (3).

A substantially tubular seal guide (7) is fixedly attached to the compressible valve (6) and comprises a closed end and seal guide bearing surface (32) proximate to the valve bulb (18). The seal guide (7) is slidably mounted in the switch housing (11) such that the collapsing of the compressible valve (6) is constrained to substantially axial movement. The distance traveled by the valve bulb (18) away from the input end (2) and towards the output end (3) is governed by a sequencing mechanism (20) well known to those skilled in the art of retractable pen design.

Referring to FIG. 5 and FIG. 3b, sequencing mechanism (20) comprises a substantially tubular switch housing (11), a spinner (9), a switch (8), and a compression spring (10). Switch housing (11) further comprises at least one elongate protrusion (21) from the inner surface with rounded first end (22) and substantially aligned with the tubular axis as shown in FIG. 3a. Switch housing (11) also comprises at least one vent slot (23) on the outer surface and substantially aligned with the tubular axis to allow the air pressure to equalize in each undulation (17) cavity and the remaining volume within the compressible seal (6) as shown in FIG. 5. Substantially tubular spinner (9) comprises at least one elongate groove (26) and at least one first helical spinner surface (24) that intersects the elongate groove (26) and at least one second helical spinner surface (25). Spinner is slidably mounted in switch housing (11) with elongate groove (26) engaged upon elongate protrusion (21) such that rotation of the spinner (9) about the tubular axis is constrained at all axial positions. Substantially tubular switch (8) is slidably mounted in switch housing (11) and comprises at least one switch slot (27) sized to engage elongate protrusion (21) when axially positioned coincident with elongate protrusion (21). When the switch (8) is axially positioned such that the switch slot (27) does not engage elongate protrusion (21), the switch is free to rotate about the tubular axis. Switch further comprises rounded end (28) such that the friction of rotation while bearing upon seal guide bearing surface (22) is minimized as shown in FIG. 3b. Referring again to FIG. 5, switch (8) further comprises at least one first helical switch surface (29) which intersects switch slot (27) and at least one second helical switch surface (30) which terminates into a substantially axial wall (31). First helical switch surface (29) and second helical switch surface (30) comprise a switch rounded bearing surface (33). Compression spring (10) is slidably installed in switch housing (11) and provides a light and continuous bias upon the spinner (9) away from the output end (3) of the main housing (1). The compression spring (10) bias further causes spinner (9) to be biased against switch (8) which is in turn biased against seal guide bearing surface (22) thus biasing valve bulb (18) toward the input end (2) as shown in FIG. 3b.

The net force acting upon the valve bulb (18) is determined by a force balance between the fluid pressure applied to the outside of the compressible valve (6), the internal pressure trapped within the compressible valve (6), the natural restoring force of the flexible undulations (17) and the force exerted by compression spring (10). In the absence of sufficient external pressure to overcome the aforementioned restoring forces, the valve bulb will be axially positioned in the free state shown in FIG. 3b, FIG. 4a, and FIG. 4e.

Fixedly attached within valve seat cavity (15) is a valve seat (12) that has a throat diameter (19) smaller than the diameter of the valve bulb (18). Therefore, when compressible valve (6) moves toward the output end (3), the valve bulb (18) contacts valve seat (12) around a circular perimeter and the flow of fluid from the input end (2) towards the output end (3) is restricted. This is referred to as the closed position and is shown in FIG. 3d and FIG. 4c. When the increased external pressure is removed, the compressible valve will return to its free state.

Figure 4E:
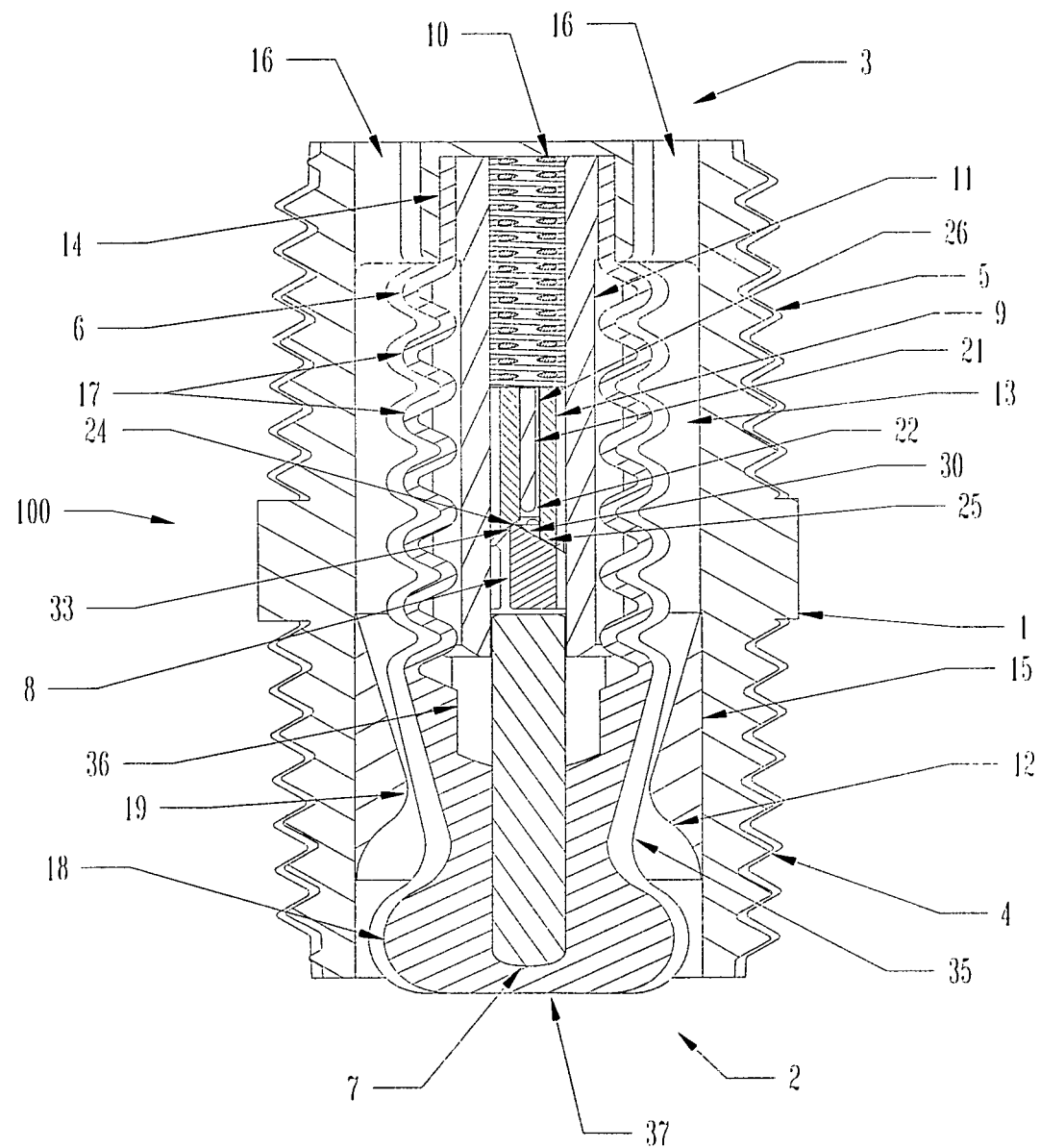
FIG. 4e: Is a section as defined in FIG. 2 through the preferred embodiment showing the sequencing mechanism details in the third free state.

In the absence of sufficient external pressure, the sequencing mechanism (20) will either be in a first free state as shown in FIG. 4a or in the third free state as shown in FIG. 4e. The sequencing of the mechanism described here assumes that the sequencing mechanism (20) starts from first free state as shown in FIG. 4a. When sufficient external pressure is applied to overcome the restoring forces, the valve bulb (18) of compressible valve (6) will begin to move away from the input end (2) and towards the output end (3). Motion of the valve bulb will push the switch (8) and spinner (9) and compress compression spring (10). Purely axial motion of the sequencing mechanism will continue until first helical switch surface (29) makes contact with rounded first end (22) of elongate protrusion (21) as shown in FIG. 4b. As switch (8) continues to move toward the output end (3), the first helical switch surface (29) bearing against the rounded first end (22) of elongate protrusion (21) causes the switch (8) to follow a helical path. The rotation of switch (8) compared to the non-rotating spinner (9) causes the switch rounded bearing surface (33) to bear against the first helical spinner surface (24) thus pushing the spinner towards the output end (3). If the external pressure is sufficient to overcome the restoring forces, the sequencing mechanism (20) will continue to move axially away from the input end (2) and the switch slot (27) will engage elongate protrusion (21) as shown in FIG. 4c. The axial motion will stop when valve bulb (18) contacts valve seat (12). In this position, the flow of fluid from the input end (2) to the output end (3) is restricted and the valve is in the second "closed" state as shown in FIG. 4c and FIG. 3d.

When the external fluid pressure is sufficiently reduced, the net restoring forces will cause compressible valve (6) to begin to move away from the output end (3) and towards the input end (2). Bias from compression spring (10) acting upon spinner (9) forces second helical spinner surface (25) to bear against first helical switch surface (29) and second helical switch surface (30). This bias force would tend to rotate switch (8) if not for switch slot (27) being engaged upon elongate protrusion (21). When the compressible valve (6) has moved to the position shown in FIG. 4d, switch slot (27) disengages elongate protrusion (21) and switch (8) rotates as helical spinner surface (25) slides along first helical switch surface (29) and second helical switch surface (30). The rotation of switch (8) is limited when rounded bearing surface (33) contacts first helical spinner surface (24). When the fluid pressure is sufficiently reduced, the compressible valve (6) and sequencing mechanism (20) will come to rest at a third free state as shown in FIG. 4e.

Figure 4F:
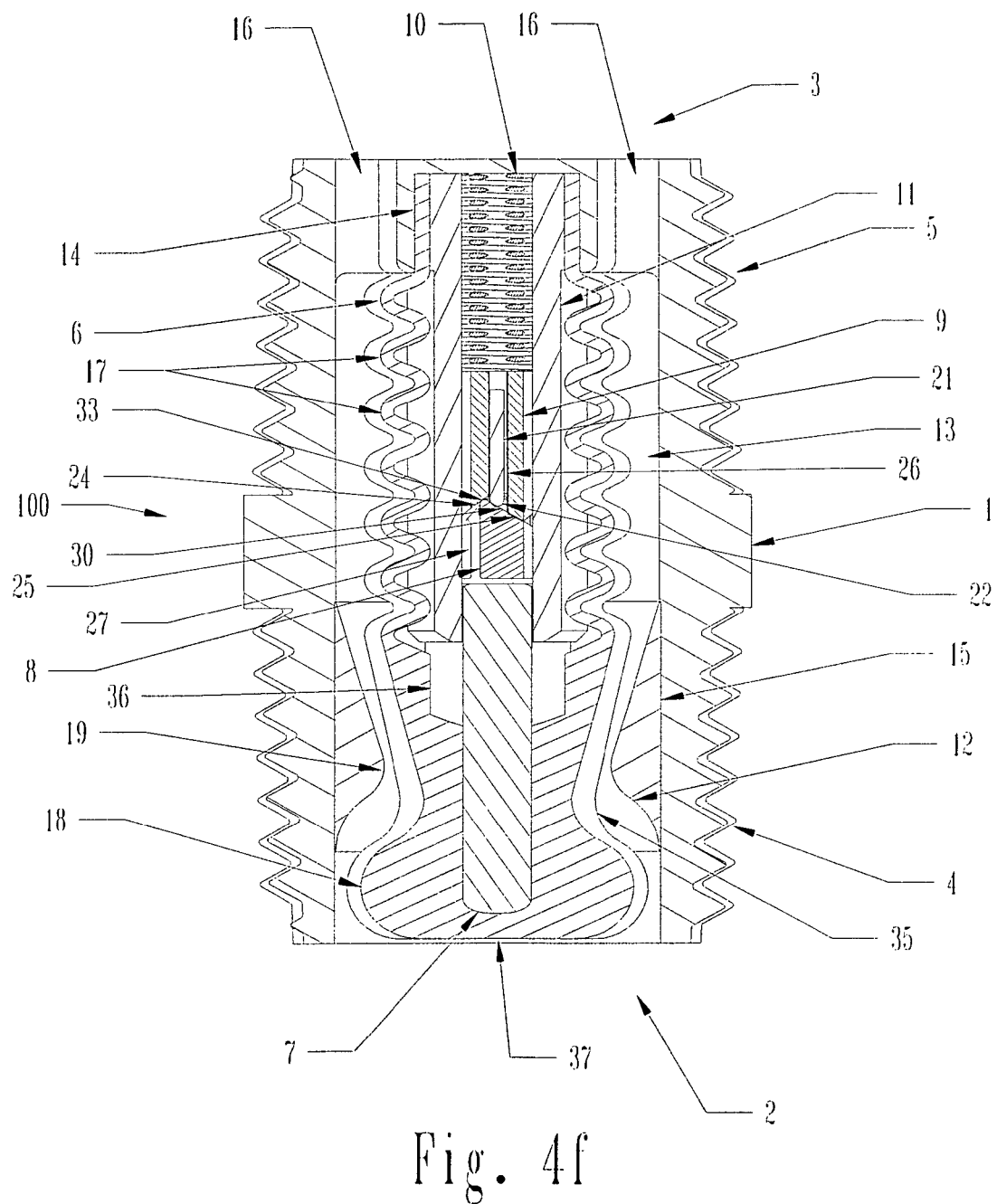
FIG. 4f: Is a section as defined in FIG. 2 through the preferred embodiment showing the sequencing mechanism details while moving from third free state to the fourth open state.
Figure 4G:
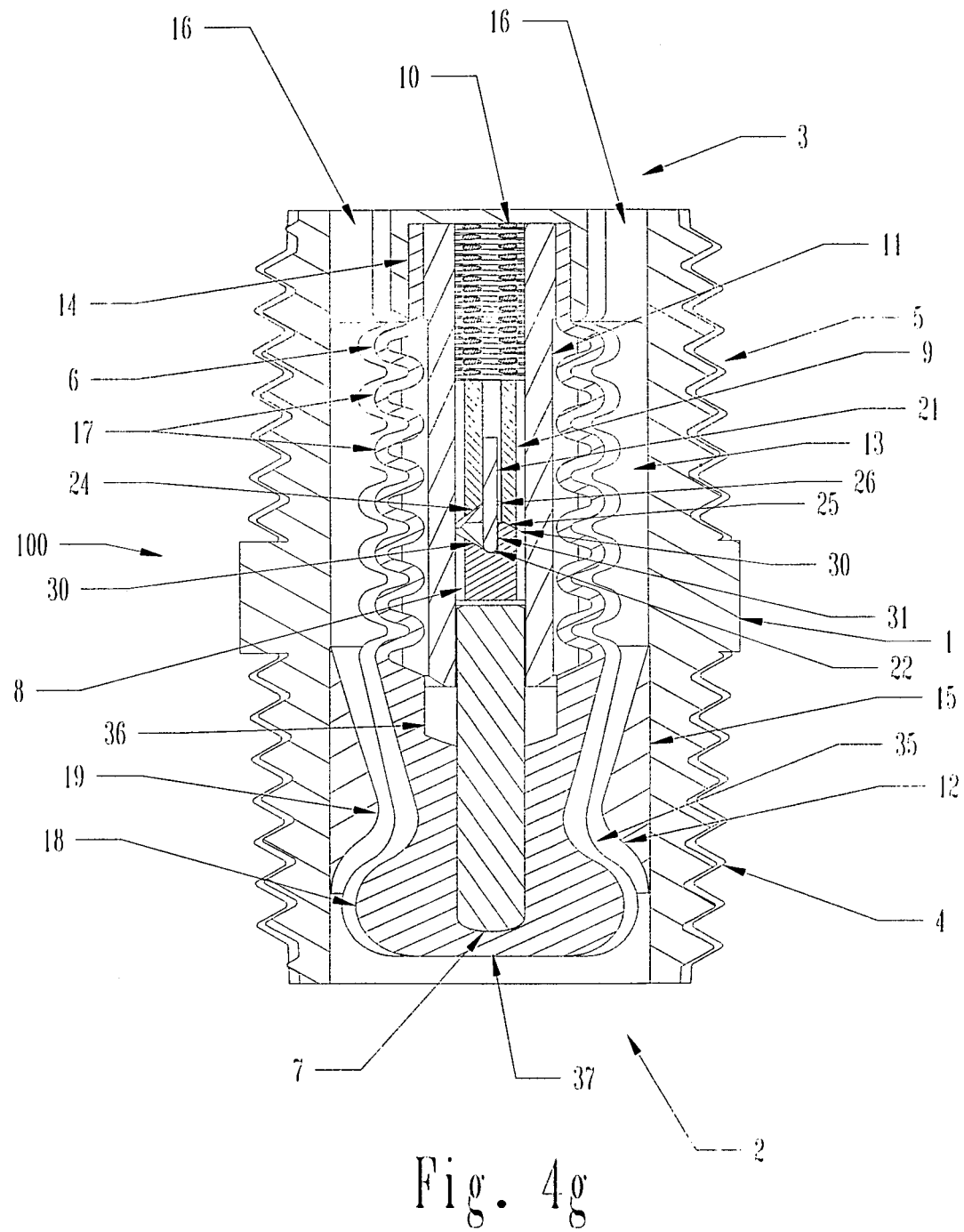
FIG. 4g: Is a section as defined in FIG. 2 through the preferred embodiment showing the sequencing mechanism details in the fourth open state.
Figure 4H:
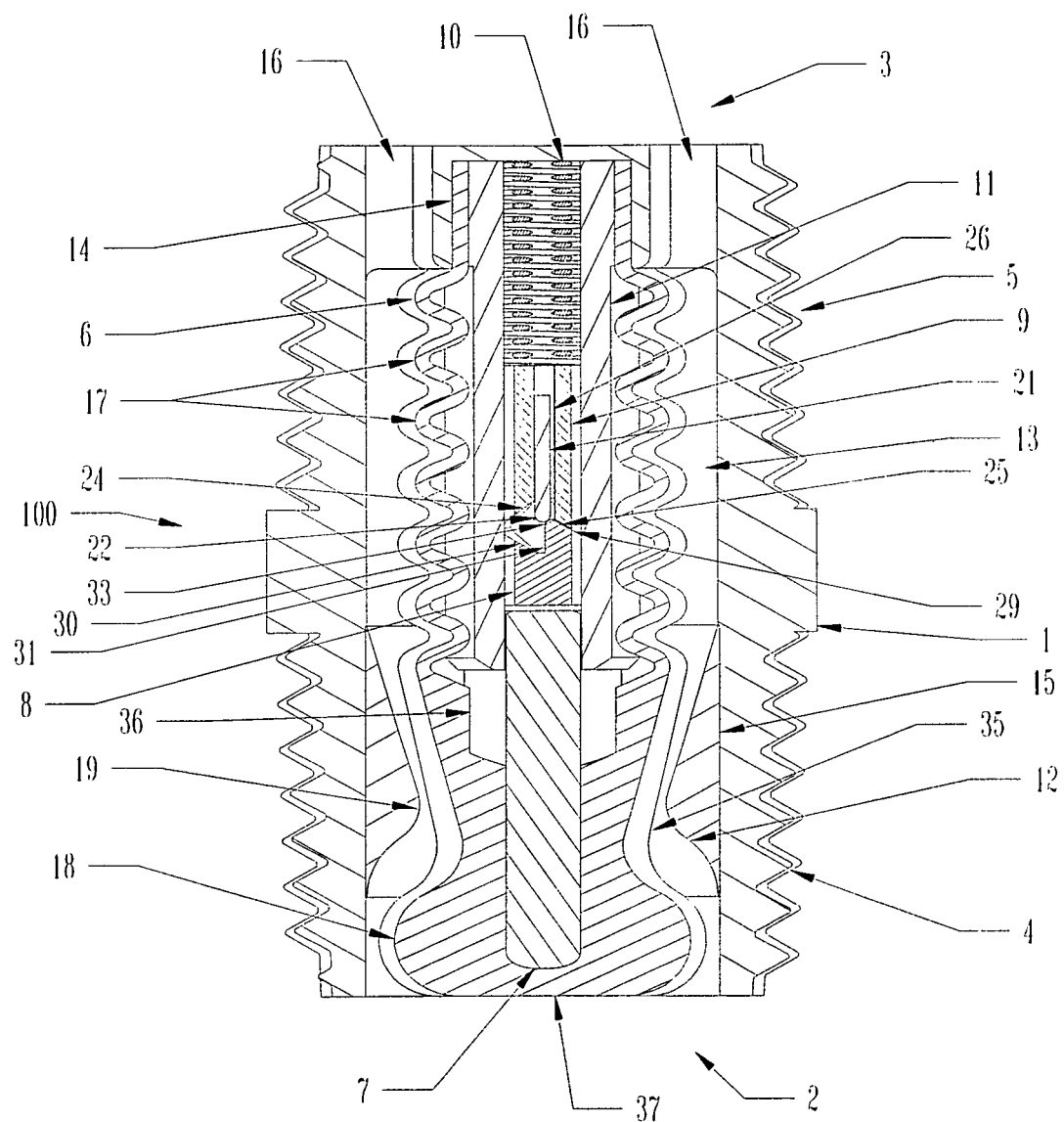
FIG. 4h: Is a section as defined in FIG. 2 through the preferred embodiment showing the sequencing mechanism details while moving from the fourth open state to the first free state.

When sufficient external pressure is applied to overcome the restoring forces for a second time, the valve bulb (18) of compressible valve (6) will begin to move away from the input end (2) and towards the output end (3) as before. Purely axial motion of the sequencing mechanism will continue until second helical switch surface (30) makes contact with rounded first end (22) of elongate protrusion (21) as shown in FIG. 4f. As switch (8) continues to move toward the output end (3), the second helical switch surface (30) bearing against the rounded first end (22) of elongate protrusion (21) causes the switch (8) to follow a helical path. The rotation of switch (8) compared to the non-rotating spinner (9) causes the switch rounded bearing surface (33) to bear against the first helical spinner surface (24) thus pushing the spinner towards the output end (3). If the external pressure is sufficient to overcome the restoring forces, the switch (8) will continue to follow the helical path of second helical switch surface (30) until the axial wall (31) engages elongate protrusion (21) as shown in FIG. 4g. In this fourth "open" state the valve bulb (18) is favorably positioned within such that fluid can flow substantially un-restricted from the input end (2) through the throat diameter (19), main passage (13), and output passage (16) to the output end (3). This open state flow path (34) is best illustrated in FIG. 3c.

When the external fluid pressure is sufficiently reduced, the net restoring forces will cause compressible valve (6) to begin to move away from the output end (3) and towards the input end (2) as before. Bias from compression spring (10) acting upon spinner (9) forces second helical spinner surface (25) to bear against first helical switch surface (29) and second helical switch surface (30). This bias force would tend to rotate switch (8) if not for axial wall (31) being engaged upon elongate protrusion (21). When the compressible valve (6) has moved to the position shown in FIG. 4h, axial wall (31) disengages elongate protrusion (21) and switch (8) rotates as helical spinner surface (25) slides along first helical switch surface (29) and second helical switch surface (30). The rotation of switch (8) is limited when rounded bearing surface (33) contacts first helical spinner surface (24). When the fluid pressure is sufficiently reduced, the compressible valve (6) and sequencing mechanism (20) will come to rest at the first free state as shown in FIG. 4*a*.

The above described sequence thus repeats indefinitely for each application and removal of external pressure with the pressurized valve state alternating between a closed state and an open state.

An important feature of the present invention is the fact that the motion of compressible valve (6) does not rely upon a pressure differential between the input end (2) and the output end (3). The closed vessel formed by compressible valve (6) provides a pressure reference for the actuation force. As such, the valve can be designed for the minimum possible pressure loss between the input end (2) and output end (3) thus maximizing the pressure available for spray velocity. The preferred embodiment results in the most compact unit and provides a good compromise between physical size and pressure loss through the valve in the free flow state.

The alternating switch means described above is commonly used in retractable ballpoint pens. As such, many alternate embodiments are well known to those skilled in the art. Similarly, many other alternate switching means have been developed for such devices as alternating electrical contact switches. Any alternating means can be applied to the present invention by those skilled in the art.

Most of the contemplated switching means can be configured for different patterns of alternation. For example, by modifying the configuration of the protrusions and sloped surfaces in the preferred embodiment, the valve can be designed to remain off for two successive pressure applications and open on the third pressure application. Thus rather than half the spray heads flowing per pressure application, only one third would flow. Therefore, more spray heads could be used on the same circuit while maintaining adequate pressure.

Although a preferred embodiment has been illustrated and described, various changes may be made in the form, composition, construction and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

What I claim is:

1. A fluid flow apparatus comprising:
   a housing having an inlet end and an outlet end;
   a valve seat disposed upon an inside surface of the housing;
   a valve having an outer valve surface, the valve being hollow such that a chamber is defined within the valve; and
   a sequencing mechanism disposed within the valve in the chamber, the sequencing mechanism configured to cycle between a plurality of mechanical states in response to repeated application and relaxation of a predetermined level of fluid pressure to the inlet including:
   (1) a first state wherein the sequencing mechanism maintains a spacing between the outer valve surface and the valve seat to allow fluid to flow through the apparatus; and
   (2) a second state wherein the outer valve surface seals to the valve seat to resist fluid flow between the inlet end and the outlet end of the valve housing, wherein the predetermined level of fluid pressure is substantially the same for the first state and the second state;
   wherein the outer valve surface includes undulations enabling the valve to expand and contract in an axial direction.

2. A fluid flow apparatus comprising:
   a housing having an inlet end and an outlet end;
   a valve seat disposed upon an inside surface of the housing;
   a valve having an outer valve surface, the valve being hollow such that a chamber is defined within the valve; and
   a sequencing mechanism disposed within the valve in the chamber, the sequencing mechanism configured to cycle between a plurality of mechanical states in response to repeated application and relaxation of a predetermined level of fluid pressure to the inlet including:
   (1) a first state wherein the sequencing mechanism maintains a spacing between the outer valve surface and the valve seat to allow fluid to flow through the apparatus; and
   (2) a second state wherein the outer valve surface seals to the valve seat to resist fluid flow between the inlet end and the outlet end of the valve housing, wherein the predetermined level of fluid pressure is substantially the same for the first state and the second state;
   wherein the valve forms a closed vessel which defines the chamber and protects the sequencing mechanism.

3. A fluid flow apparatus comprising:
   a housing having an inlet end, an outlet end, and an inner surface;
   a valve having a flexible valve body defining a compressible closed air chamber within the flexible valve body and coupled at one end to the housing, the flexible valve body and compressible closed air chamber positioned between the outlet end and inlet end such that an annular gap is defined between the flexible body and the inner surface and around the compressible closed air chamber, the valve further having an outer surface configured to:
   (1) cooperate with the housing inner surface to form an annular fluid flow path when the valve is in an open state;
   (2) form a circumferential seal with the housing inner surface when the valve is in a closed state; and
   a sequencing mechanism disposed within the compressible closed air chamber, the sequencing mechanism housing configured to cycle the valve between the open state and the closed state in response to a repeated application of a predetermined level of fluid pressure at the inlet, wherein the predetermined level of fluid pressure is substantially the same for the open state and for the closed state.

4. The fluid flow apparatus of claim 3 wherein the annular fluid flow path is substantially aligned with an axis defined by the inlet and outlet and a fluid flow direction is aligned within 45 degrees of the axis at all points between the inlet and outlet.

5. The fluid flow apparatus of claim 3 wherein the annular fluid flow path has a substantially constant cross sectional area perpendicular to a fluid flow direction.

\* \* \* \* \*